US00RE43211E

(19) United States
(12) Reissued Patent
Schlumberger

(10) Patent Number: US RE43,211 E
(45) Date of Reissued Patent: Feb. 21, 2012

(54) HOST-BASED POWER SAVINGS METHOD AND APPARATUS

(75) Inventor: Maurice Schlumberger, Menlo Park, CA (US)

(73) Assignee: Seagate Technology LLC, Scotts Valley, CA (US)

(21) Appl. No.: 12/708,129

(22) Filed: Feb. 18, 2010

Related U.S. Patent Documents

Reissue of:

(64) Patent No.: 7,334,144
Issued: Feb. 19, 2008
Appl. No.: 10/861,114
Filed: Jun. 4, 2004

U.S. Applications:

(60) Provisional application No. 60/476,250, filed on Jun. 5, 2003.

(51) Int. Cl.
*G06F 1/32* (2006.01)

(52) U.S. Cl. ..... 713/320; 713/300; 713/310; 713/321; 713/322; 713/323; 713/324; 713/330; 713/340; 711/4; 711/112; 711/114; 455/574

(58) Field of Classification Search ..... 713/300, 713/310, 320–324, 330, 340; 711/4, 112, 711/114; 455/574
See application file for complete search history.

(56) References Cited

U.S. PATENT DOCUMENTS

| | | | | |
|---|---|---|---|---|
| 5,898,880 | A * | 4/1999 | Ryu | 713/323 |
| 5,907,713 | A * | 5/1999 | Chen et al. | 713/320 |
| 5,954,820 | A * | 9/1999 | Hetzler | 713/323 |
| 6,049,884 | A * | 4/2000 | Tsuji | 713/323 |
| 6,052,791 | A * | 4/2000 | Chen et al. | 713/300 |
| 6,490,651 | B1 * | 12/2002 | Shats et al. | 711/112 |
| 6,549,973 | B1 * | 4/2003 | Kibashi et al. | 711/4 |
| 6,553,501 | B1 * | 4/2003 | Yokoe | 713/320 |
| 6,609,177 | B1 * | 8/2003 | Schlumberger et al. | 711/122 |
| 6,715,088 | B1 * | 3/2004 | Togawa | 713/320 |
| 6,947,775 | B2 * | 9/2005 | Okamoto et al. | 455/574 |
| 2003/0225969 | A1 * | 12/2003 | Uchida et al. | 711/112 |
| 2004/0055446 | A1 * | 3/2004 | Robbin et al. | 84/615 |

OTHER PUBLICATIONS

Dimitrijevic, Zoran, http://www.usenix.org/events/fast03/tech/full_papers/dimitrijevic/dimitrijevic_html/node11.html/, Jan. 6, 2003, 1 page.
Press Release, "Seagate Unveils New Versions of World's Favorite Enterprise Disc Drives", Nov. 1, 1999, 3 pages.

* cited by examiner

*Primary Examiner* — M Elamin
(74) *Attorney, Agent, or Firm* — Crawford Maunu PLLC

(57) ABSTRACT

A system which includes a disk drive or other storage device coupled to a host system provides for reduction of the amount or rate of drive power consumption using procedures which are at least partially executed on the host. The system can be configured to reduce average power draw, maximum power draw, or both. Host-based procedures can be tailored to specific and/or changing environments and can decrease some or all expenses associated with previous attempts to reduce HDD power consumption.

42 Claims, 4 Drawing Sheets

HOST-BASED POWER SAVINGS METHOD AND APPARATUS

Matter enclosed in heavy brackets [ ] appears in the original patent but forms no part of this reissue specification; matter printed in italics indicates the additions made by reissue.

CROSS-REFERENCE TO RELATED APPLICATIONS

Priority is claimed from U.S. Provisional Patent Application Ser. No. 60/476,250 filed Jun. 5, 2003 entitled "Filter Driver Power Save Mode," which is incorporated herein by reference in its entirety.

FIELD OF THE INVENTION

The present invention is related to reducing the amount and/or rate of power consumption by a disk drive or similar storage device and, in particular, to a power saving method and apparatus substantially implemented in a host device that is coupled to the data storage device.

BACKGROUND INFORMATION

Reduction of power consumption can be useful in a number of contexts, but is of particular interest in connection with mobile or portable devices such as laptop or other mobile or portable computers, portable audio-play, or other portable consumer electronic devices and the like. Power usage can also be of concern in connection with non-portable devices (e.g., desktop computers and the like), at least, since power consumption represents an energy cost generally paid by the user, and further it is generally correlated with an undesirably increased heat budget.

It is also possible to configure and/or manage disk drives so as to enhance disk drive performance (characteristics other than power consumption such as the effective amount of data that can be stored or retrieved per unit time and/or such as storage or retrieval reliability and the like). Some drives (such as some SCSI and/or ATA5 drives) use Native Command Queuing (NCQ) to reorder commands to achieve improved performance. Often, procedures which improve performance are opposite to procedures that save power. For example, although effective performance may be increased by fetching more data than requested (e.g., pre-fetch and/or post-fetch), at least, some such procedures, in previous approaches, increase average hard disk power consumption. In some audio playback devices, large amounts of audio data, e.g., according to a "play list" are transferred from disk to host memory, allowing the disk to be "spun down" while music is played back from memory.

Accordingly, it would be useful to provide a method and apparatus which can reduce the overall power consumption, preferably while retaining an ability to achieve at least some degree of performance enhancement.

At least some prior power-saving approaches have focused on aspects of the disk drive (as opposed, e.g., to the host device which sends data and/or instructions to, and/or receives data from, the disk drive). Such previous approaches can generally be considered as involving disk drive hardware or disk drive procedures (e.g., firmware or other programming executed in the disk drive, as opposed to the host device). Such disk drive-based approaches can have certain undesirable characteristics. Hardware approaches, which involve using relatively less power-consumptive devices, generally involve using undesirably high-cost parts. Providing for power-saving procedures within the drive (such as drive firmware or other programming) can involve several disadvantageous features. Such drive-based programming, especially firmware, is typically difficult, or completely infeasible, to change, e.g., once the drive has been manufactured, thus providing for substantial inflexibility. Accordingly, in at least some approaches, disk drives configured with procedures appropriate for power-saving in a particular environment (such as a network server environment versus a workstation (desktop) or laptop environment) may be entirely inappropriate for use in a different environment. This approach means multiple models are needed to serve multiple needs, which can undesirably increase a number of costs such as costs associated with the design, selection, installation, manufacture and/or maintenance of a multiplicity of models. If drives are used outside the specified environment, the rigidity of this approach can prevent further optimization or reduction in power usage.

Furthermore, the storage and/or execution of potentially long and complex power-saving programming within the disk drive requires consumption of disk drive resources, such as disk drive power resources (as well as, potentially, memory resources and/or computing or logic resources). In many systems, the power and/or heat budget of a disk drive is substantially more constrained than that of the host system.

Accordingly, it would be useful to provide a method and apparatus for saving power in a drive without the power-saving features being substantially based in the disk drive and, preferably, while still accommodating at least some performance enhancement. Preferably, power-saving is implemented so as to provide for flexibility, such as more readily accommodating multiple environments and/or improvements.

SUMMARY OF THE INVENTION

The present invention includes a recognition and/or appreciation of the existence and/or nature of problems in previous approaches, including those described herein.

In one embodiment, the invention provides for host-based power-saving for the disk drive, preferably while balancing power-saving and performance features or procedures, so as to provide both a degree of power-savings and a degree of performance enhancement.

In one embodiment, the host device executes a procedure, such as that contained in a filter driver or other programming, which executes on the host device and, as a result, sends a stream of commands and/or data to the disk drive which results in power-savings, i.e., such that the disk drive, while performing read/write or other "normal use" operations consumes an amount of power (e.g., averaged or consumed over a period of time, over a number of operations, or over an amount of data) which is less than the amount of power that would have been consumed while performing such normal use operations, if the power-saving procedures had not been executed on the host device. Preferably, the procedures executed on the host device also provide some degree of performance enhancement, i.e., provide an increase in performance (such as increased data storage and/or retrieval per unit time, and/or increased data storage reliability, and the like) compared to the performance that would have occurred if the procedures had not been executed on the host device.

In one embodiment, a system which includes a disk drive or other storage device coupled to a host system provides for reduction of the amount or rate of drive power consumption using procedures which are at least partially executed on the host. The system can be configured to reduce average power draw, maximum power draw, or both. Host-based procedures can be tailored to specific and/or changing environments and can decrease some or all expenses associated with previous attempts to reduce HDD power consumption.

DETAILED DESCRIPTION OF THE PREFERRED EMBODIMENT

Figure 1:
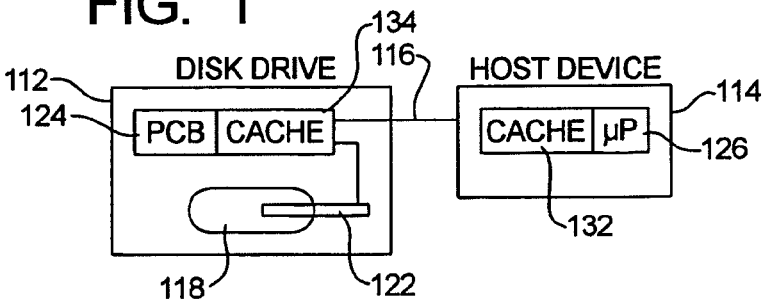
FIG. 1 is a block diagram illustrating certain components of a computing system of a type that can be used when implementing embodiments of the present invention.

Systems which include a disk drive (or other data storage device) are often viewed as having an architecture similar to that depicted in FIG. 1. In the architecture depicted in FIG. 1, the disk drive 112 is coupled to a host device 114 by a communication channel 116 used for transferring data (as well as, typically, commands, acknowledgements, requests, and similar non-user data communication) from the host device 114 to the disk drive 112 and/or from the disk drive 112 to the host device 114. In a typical implementation, the host device 114 is a computer, although the architecture of FIG. 1 can be applied to many systems including audio and/or video playback devices or other electronic devices and the like.

In general, the disk drive 112 will include, in addition to the disk 118, one or more heads, arms and/or actuators 122, along with electronics, which are often provided on a printed circuit board 124 and the like. The electronics 124 provide a number of features, as is generally well known in the art, including controlling the movement and operation of the read/write head, data or command buffering, signal bridging and the like.

In most systems, the host device 114 will include some form of electronic control or logic such as a microprocessor 126, although other logic/control devices may be provided such as logic arrays, application specific integrated circuits (ASIC's) and the like. As will be understood by those with skill in the art, various architectures, including that depicted in FIG. 1 can be implemented in a variety of physical structures, and, in particular, the HDD 112 may be positioned in the same housing or other enclosure as the host device 114 (or one such enclosure when there is more than one host device or the host device has more than one enclosure), in which case the communication channel 116 typically includes a bus, cable, and the like or may be housed in a separate enclosure (in which [the] case the communication channel 116 is typically a USB link, a 1394 link, an Ethernet or other network link, a wireless link and the like).

In a typical system, transfer of data between the host and the disk drive is mediated by one or more caches, which are typically volatile electronic memory. In the system of FIG. 1 two caches are shown: a host cache 132, controlled by, and typically housed in, the host device and a disk cache 134. The disk cache 134 is typically controlled by disk firmware, although it may respond (at least indirectly) to commands from the host, such as a "flush" command. Unless otherwise indicated, all references below to a "cache" refer to the host-based cache 132.

As noted above, it is often advantageous *to* reduce the magnitude and/or rate of power consumption during normal operation both of an entire system and, especially, of a disk drive or other data storage device. The use of relatively low power-consumption hardware in a disk drive is often undesirably expensive. In some previous approaches, certain power-saving procedures, often embodied in firmware, have been attempted, e.g., as depicted in simplified fashion in FIG. 2.

Figure 2:
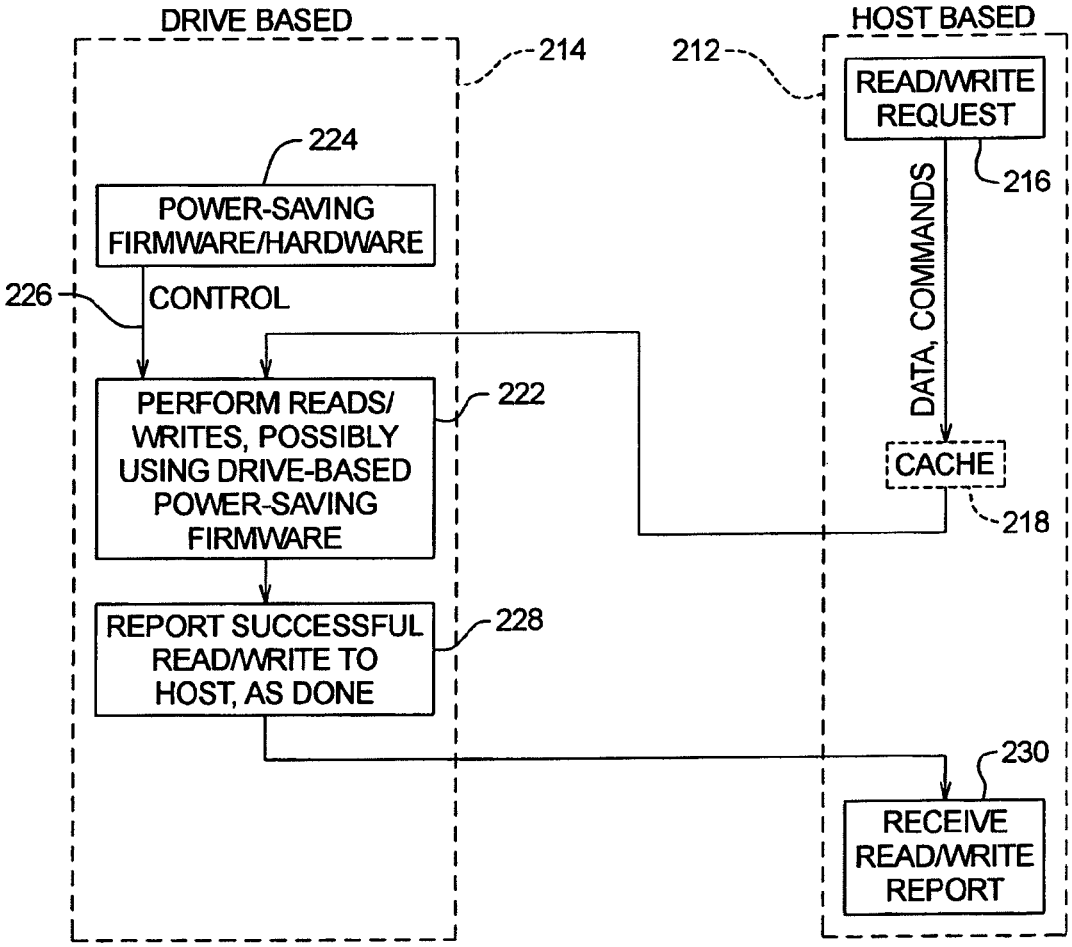
FIG. 2 PRIOR ART
FIG. 2 is a flowchart of a procedure which can use disk-based power saving according to some previous approaches.

In the illustration of FIG. 2, various steps are shown as being either host-based 212 (i.e., performed using the microprocessor or other logic 126 of host device 114) or drive-based 214 (i.e., using procedures executed or implemented in logic or other circuitry 124 of the HDD 112). FIG. 2 illustrates an example in which power-saving procedures are HDD-based (as opposed to being host-based).

In the illustration of FIG. 2, the host issues a read and/or write request 216. Optionally, some of or all of the data and commands of the read/write request 216 may be stored in a cache 218. Regardless of whether or not a cache 218 is used, in the illustration of FIG. 2, the drive 112 performs requested reads/writes 222, possibly using drive-based power-saving firmware 224, which provides at least some control signals 226 for implementing power-saving procedures on the disk drive. As the read/write operations are successfully performed, typically, the drive will report the successful operation 228 to the host 114 (or will simply send requested data, and the like, to the host) and the host will receive the reports and/or data 230. As depicted in FIG. 2, the power-saving procedures are drive-based, at least in the sense that the power-saving procedures, when and if used, are executed by processor, logic or other circuitry which resides on the HDD 112 (as opposed to being executed by the microprocessor or other objects residing on the host 114). As described above, in addition to power-saving procedures, previous approaches often used (typically relatively expensive) power-saving hardware.

Figure 3:
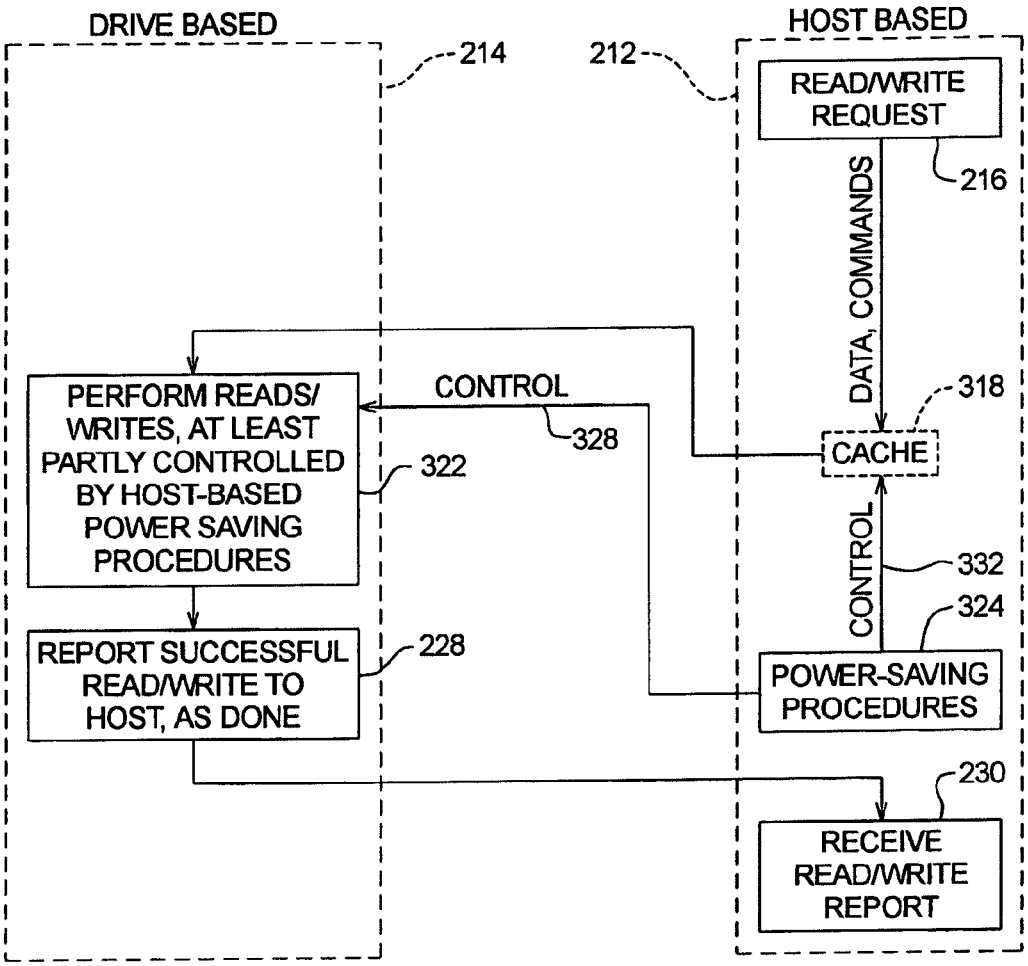
FIG. 3 is a flowchart of a host-based power saving procedure according to an embodiment of the present invention.

FIG. 3 illustrates a procedure according *to* an embodiment of the present invention. In the illustration of FIG. 3, power-saving procedures 324 are host-based 212, i.e., some or all power-saving procedures are performed by the host microprocessor 126 or other logic or control circuitry based on the host 114. As shown by the examples described below, any or all of a number of host-based power-saving procedures can be used, including procedures involving control 328 of reads/writes performed on the disk drive 322 and/or control 332 of a host-based data cache 318 (if used), typically coordinated with power-saving procedures executed on the disk drive 322.

Without wishing to be bound by any theory, it is believed likely that one reason previous power-saving procedures have been drive-based (as shown on FIG. 2) is that often the particular procedures or parameters involved in power-savings for drives is quite specific to the particular drive, generally requiring detailed knowledge of the configuration and operation of the disk drive. It is believed that many (although not necessarily all) previous approaches preferred to have host systems operate as though the disk drive or other storage device was a "black box," such that the host device sent or received data and commands, with little regard for how the disk drive performed the commands. It is believed that such system design approaches were contributing factors, in previous decisions, to base power-saving procedures on the hard drive. It is also believed that, in general, operating system manufacturers had little or no interest in providing host-based procedures for saving power on a disk drive. Without wishing to be bound by any theory, it is believed likely that one reason operating system manufactures did not provide host-based procedures for saving power on a disk drive was that their orientation was toward a higher-level of procedures (such as providing various levels of sleep mode, applicable to many peripherals) and were not directed to "lower-level" details, such as the items described herein.

One aspect of the present invention involves shifting the consumption of resources and/or power, used for executing power-saving procedures, from the storage device to the host device (where there are often fewer constraints on resource, power, and/or heat budgets and where power can be better managed, since, in general, the host is more capable of managing power). One aspect of the present invention is that drive heat/power can be reduced by using a more "intelligent" resource or approach. FIGS. 5-9 provide (not necessarily exhaustive) illustrations of power-saving techniques which can be implemented in host-based power-savings according to the embodiments of the present invention.

Figure 4:
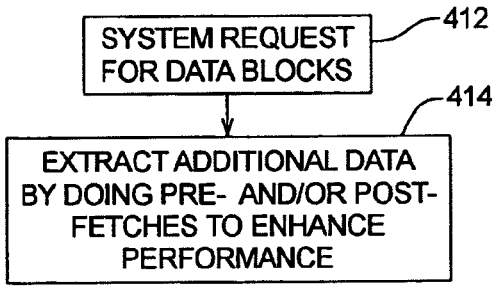
FIG. 4 PRIOR ART
FIG. 4 is a flowchart illustrating a performance enhancing process according to previous approaches.

In at least one previous approach, as illustrated in FIG. 4, in response to a system's request for reading of data blocks from a storage device 412, the system would sometimes attempt to enhance performance by extracting additional data (in excess of that which had been requested) by doing pre-fetches and/or post-fetches 414, i.e., by also reading data substantially adjacent to the requested data, typically in rotational or radial locations immediately prior to, or immediately after, the location of the requested data (with respect to head and disk movement).

Figure 5:
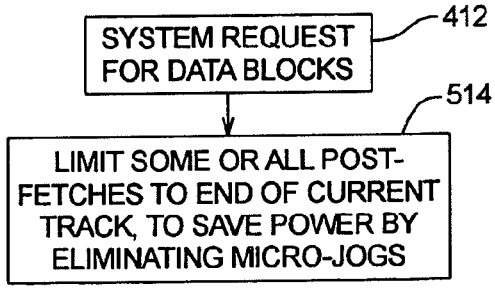
FIG. 5 is a flowchart illustrating a power saving procedure according to an embodiment of the present invention.

In the embodiment of the invention illustrated [of] *in* FIG. 5, in response to a similar request 412, the system, while it may perform some amount of pre-fetch and/or post-fetch, will limit, e.g., post-fetches to that data occurring at the end of the current track (i.e., avoiding doing additional micro-jogs to nearby tracks in order to perform further post-fetch). Thus, the approach illustrated in FIG. 5, while achieving some degree of performance enhancement (by performing a limited amount of pre- and/or post-fetch) balances performance against power-savings, thus achieving a degree of power-savings as well as a degree of performance enhancement.

Figure 6:
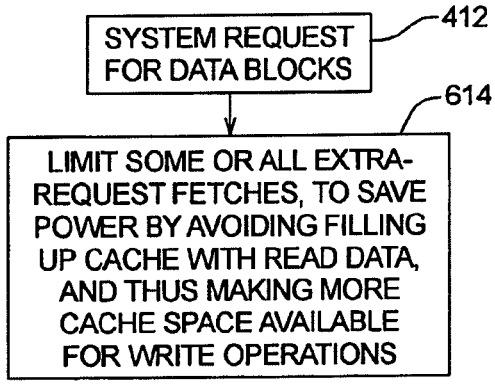
FIG. 6 is a flowchart illustrating a power saving procedure according to an embodiment of the present invention.

In the approach illustrated in FIG. 6, in response to a system request for data blocks 412, limitations on post fetches, or other extra-request fetches, are configured so as to avoid filling up the cache with such read data 614. This approach makes, on average, a greater amount of cache space available for write operations which, in general, can lead to greater power-savings than a situation in which a greater portion of the cache is filled with read data. The approaches of FIGS. 5 and 6 are not necessarily incompatible and embodiments of the present invention can be implemented in which both approaches are used.

In some embodiments, the host can be configured to execute different power-saving techniques. Which technique or suite of techniques are to be used can be selected in various manners, including being pre-selected by the system, host, or drive manufacturer, being selected by the user or being selected automatically, e.g., by the host system, based on any of various factors including current power source (e.g., battery versus AC or line power), charge state of the battery, type of applications, and/or communications being run or executed, time of day, location and the like.

Figure 7:
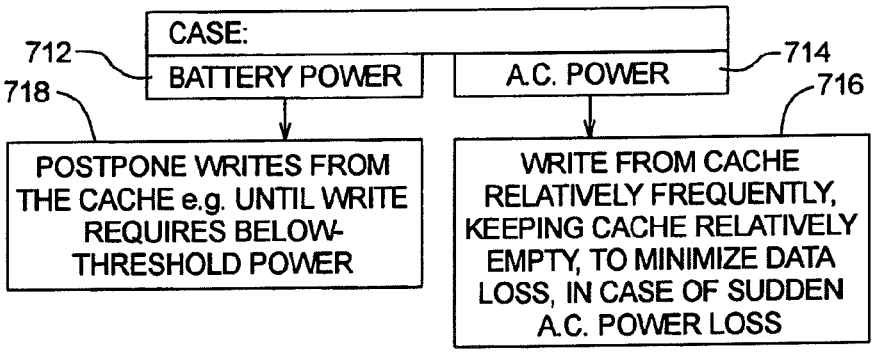
FIG. 7 is a flowchart illustrating a power saving procedure according to an embodiment of the present invention.

In the illustration of FIG. 7, a choice relating to power-savings is made depending upon whether the system is running under battery power 712 or AC (line) power 714. In the situation depicted in FIG. 7, when the system is running on AC (line) power 714, the system is configured to keep the write cache relatively empty such as by writing from the cache (to the disk) relatively frequently, e.g., in order *to* minimize data loss in case of sudden AC power loss 716. However, in the situation depicted in FIG. 7, if the system is running on sufficient battery power, a substantially opposite approach is taken in which writes from the cache, rather than being performed relatively frequently, are intentionally postponed, e.g., until performing the write would require a below-threshold amount of power 718 (such as performing "opportunistic" writes when the head happens to be in the vicinity of the destination location for the write).

The situation depicted in FIG. 7 can be advantageous at least because performing opportunistic writes results in a lower power consumption which can be generally desirable, and is typically especially desirable when the system is running on battery power. On the other hand, when battery power is available, there is relatively little risk of data loss (of the type that can occur in case of sudden loss of AC power), since data which may be in the cache or other volatile memory can be retained using battery power. As illustrated in FIG. 7, embodiments of the present invention include situations in which the host system controls the operation of the disk drive so as to use system resources for performance enhancement 716 when AC power is being used 714, but shifts the system resources towards a power-saving mode 718 when battery power 712 is used.

Figure 8:
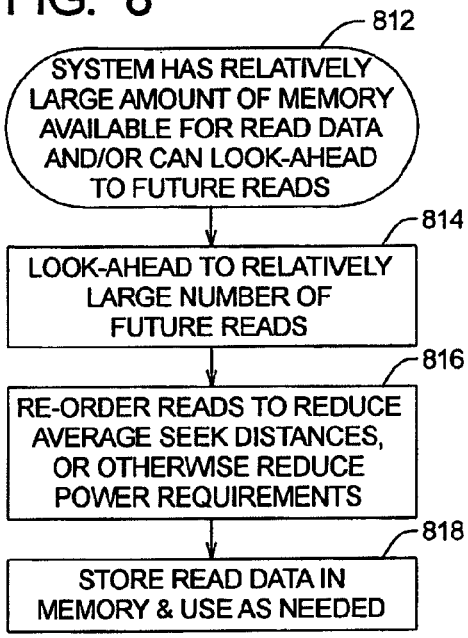
FIG. 8 is a flowchart illustrating a power saving procedure according to an embodiment of the present invention.

FIG. 8 depicts a type of power-savings that is believed to be particularly useful in a system which has a relatively large amount of memory available for read data and/or can perform look-ahead to future reads 812. In the procedure depicted in FIG. 8, the system, after performing a look-ahead in order to determine or predict a relatively large number of future read requests 814, then reorders the read requests in a fashion configured to reduce the average seek distances, or otherwise reduce power requirement 816. The host may be involved by instructing the drive to perform command reordering so as to reduce power requirements (as opposed to, for example, instructing the drive to perform command reordering so as to increase performance, as described generally above.) For example, data seek power consumption may be reduced if reads are reordered, so that they are performed based on the radial position of the data on the disks such as performing reads closest to the inner diameter and proceeding toward the outer diameter (or vice versa). This approach could, e.g., eliminate some or all power usage that might otherwise be expended on excessive back and forth radial head movement. Similar approaches could be used to minimize rotational latency between reads, thus reducing the amount of time, on average, the disk must be "spun up" to read a given amount of data. Because the reordering could provide data in an order different from that in which the data is actually needed or used by the host device, the reordered read data is preferably stored in memory so that it can be used by the host device as needed 818.

Figure 9:
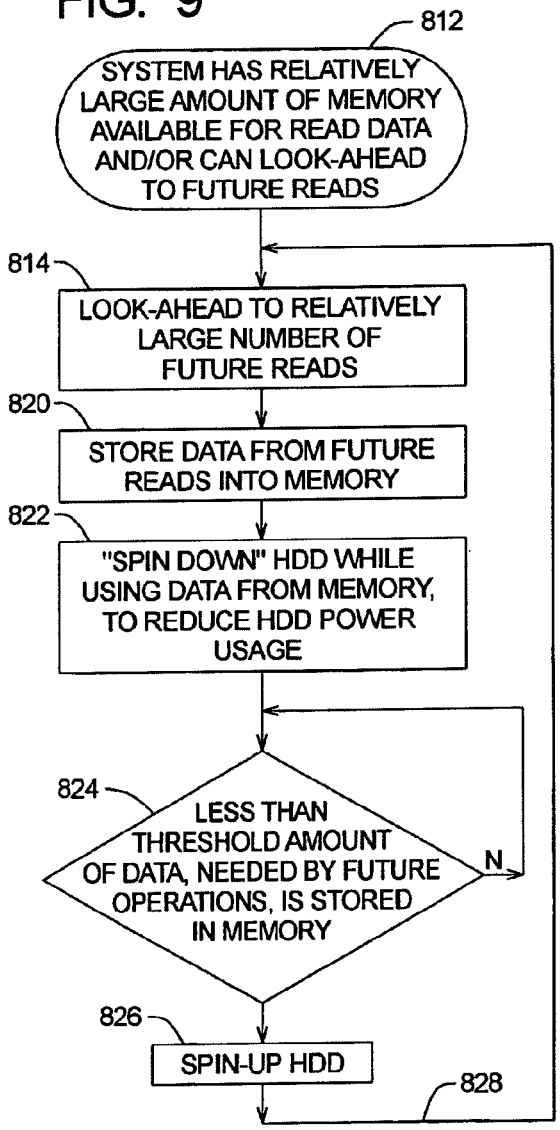
FIG. 9 is a flowchart illustrating a power saving procedure according to an embodiment of the present invention.

In the embodiment depicted in FIG. 9 (believed to be especially useful in a system 812 similar to that described above in connection with FIG. 8), performing a look-ahead 814 allows the system to store data from a relatively large number of future reads into memory 820, so that the HDD can then be spun down 822 (to reduce HDD power usage) while the host system uses data in the memory. Preferably, when a certain amount or portion of the data in the memory has been used by the host system (e.g., such that less than a threshold amount or percentage of data, needed by future operations, is stored in memory 824), the HDD can be spun up 826 and the procedure can be repeated 828.

Although FIGS. 5-9 provide examples of possible power-saving techniques, it is believed that the embodiments of the present invention can use other power-saving techniques, in addition to, or in place of those described herein, to provide systems which achieve power-savings for HDD operations which are fully or substantially host-based. A number of variations and modifications of the present invention can be used, including those described herein.

It should be noted that it is possible to use some features of the invention without using others. For example, it is possible to provide at least some host-based power-saving procedures without the power-saving procedures requiring the existence of a read/write disk-based data cache.

Although a number of examples of power-saving procedures have been provided, embodiments of the present invention can be used in which other power-saving procedures are employed and/or in which various combinations of power-saving procedures can be selected. It is possible to use procedures having more or fewer steps than those described and illustrated, or in which steps are performed in an order different from those described and illustrated.

Although in some embodiments the power-saving procedures are provided, to the host system, in the form of filter drivers, or other drivers, (e.g., with different drivers being available or used in connection with different disk drives, or classes of disk drives), it is technically possible (although not necessarily economically feasible, at present) to provide power-saving procedures in the host device in a different fashion, such as firmware, or in a hard-wired fashion.

Although the invention has been described in the context of a disk drive such as a "hard" magnetic medium disk drive, there is no technical reason why some or all features of the invention cannot be used in connection with other types of data storage devices coupled to a host device, including, e.g., optical storage devices.

Although embodiments of the invention have been described in the context of drives which are part of a computer system, there is no technical reason why some or all aspects of the present invention cannot be used in other contexts such as portable music or audio/video playback devices or other portable or non-portable consumer electronic devices. Although a number of examples for power-saving techniques that can be used in embodiments of the present invention have been provided, other host-based power-saving techniques can be implemented according to embodiments of the present invention. Although, for all purposes of clarity, various power-saving techniques have been described separately, embodiments of the present invention can involve using multiple, different power-saving techniques, including those described herein.

Although the present invention has been described in the context of executing power-saving procedures on the host device, it is at least feasible to provide some or all power-saving procedures with direct execution on the HDD (e.g., providing various HDD power modes) with the host system being configured to initiate execution and/or select various modes. The present invention allows a power-efficient HDD to be provided without having to implement all of the power-saving features in the HDD itself, including having the HDD depend on the host for guidance on power saving features and/or sharing power-saving procedures between the host and the HDD.

Embodiments of the present invention can be used to reduce power requirements, e.g., a portable system such as a personal storage device, where some peripheral devices (e.g., headsets, cameras) are slower than the associated HDD. For example, a filter driver can be programmed with disk access profiles relating to particular peripheral devices to minimize or reduce power usage.

In at least one embodiment, HDD firmware can be configured to support vendor-unique commands to implement some or all types of power conservation. Embodiments of the present invention can operate with a relatively simple focus on performance, e.g., in a manner to reduce stress and/or power utilization, e.g., when serving data streams and/or in multiple stream configurations. Similarly, in some embodiments, the caching of write commands can not only allow reordering of the write commands but may allow an HDD to remain idle for longer periods of time, thus conserving power.

In light of the above description, a number of advantages of the present invention can be seen. By providing some power-savings which is not achieved solely by employing less power-consumptive (and, typically, more expensive) hardware, the present invention makes it possible to achieve the power-savings at a relatively lower cost. By providing at least some power-saving features which involve executing procedures on a host device (as opposed to executing procedures on the drive itself), certain inflexibilities associated with at least some previous approaches are avoided. HDD operating parameters and/or power-saving procedures can be tailored to specific environments. Embodiments of the present invention can be used to trade host resources, computing power and/or bandwidth for drive power.

In at least some embodiments, power usage of an HDD can be significantly reduced without substantial hardware or software modifications to the HDD. This makes it possible to provide at least retroactive power-savings (i.e., achieve power-savings in currently-in-use systems, without the need to modify or access the HDD), such as by loading an appropriate filter driver.

The present invention makes it more feasible for HDD command management algorithms (and, to at least a certain point, architecture) for power reduction to be tested and prototyped, e.g., without having to modify the HDD or its firmware. Preferably, HDD's and companion filter drivers can be configured in a complementary sense, preferably to provide optimized, or substantially optimized, power reduction.

Embodiments of the present invention allow a relatively accurate estimate of which power conservation features should be implemented in the HDD and which ones are better managed by the host. Embodiments of the present invention can be used during normal use of a HDD or as a prototyping tool to reduce internal power usage of a drive. Embodiments of the present invention can also be used to improve reliability of a drive e.g. by reducing the number of drive operations which may risk data integrity.

The present invention, in various embodiments, includes components, methods, processes, systems and/or apparatuses substantially as depicted and described herein, including various embodiments, sub-combinations, and subsets thereof. Those with skill in the art will understand how to make and use the present invention after understanding the present disclosure. The present invention, and various embodiments, includes providing the devices and processes in the absence of items not depicted and/or described herein or in various embodiments hereof, including in the absence of such items as may have been used in previous devices or processes, e.g., for improving performance, achieving ease of implementation and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus comprising circuitry that can execute program instructions; and a memory, in functional communication with said circuitry, storing at least a first group of program instructions that, when executed in said circuitry, provides a first power saving operation that causes a hard disk drive connected with said apparatus to operate with a lower power consumption during normal operation, averaged over a time period, than a standard power consumption that would occur in the absence of executing said first group of program instructions, wherein execution of said first group of program instructions results in delaying a write operation to a target location that is relatively distant from a current disk location;

execution of said first group of program instructions results in reordering commands to an order different from an original order in which said commands would be performed in absence of executing said first group of program instructions;

execution of said first group of program instructions results in retaining write data in a cache for a period longer than an original period for which said write data would be retained in absence of executing said first group of program instructions; or execution of said first group of program instructions results in sending commands from said apparatus to said hard disk drive which can only be performed on a predefined class of disk drives.

2. The apparatus of claim 1, wherein said memory further stores a second group of program instructions that provides for a second power saving operation different from said first power saving operation.

3. The apparatus of claim 2, wherein said circuitry executes said first group or said second group of program instructions based on a detected environment.

4. The apparatus of claim 2, wherein said circuitry executes said first group or said second group of program instructions based on user input.

5. The apparatus of claim 1, wherein said result of execution of said first group of program instructions is said delaying of said write operation to said target location which is relatively distant from said current disk location.

6. The apparatus of claim 1, wherein said result of execution of said first group of program instructions is said reordering of said commands to said order different from said original order in which said commands would be performed in absence of executing said first group of program instructions.

7. The apparatus of claim 1, wherein said result of execution of said first group of program instructions is said retaining of said write data in said cache for the period longer than said original period for which said write data would be retained in absence of executing said first group of program instructions.

8. The apparatus of claim 5, wherein said delaying of said write operation continues until a drive write head is no more than a threshold radial distance from said target location.

9. The apparatus of claim 5, wherein said delaying of said write operation continues until a drive write head is no more than a threshold circumferential distance from aid target location.

10. The apparatus of claim 1, wherein said apparatus is a computer.

11. The apparatus of claim 1, wherein said apparatus is a portable electronic device.

12. The apparatus of claim 1 wherein said apparatus is substantially non-portable.

13. The apparatus of claim 1, wherein said circuitry in said apparatus comprises a microprocessor.

14. The apparatus of claim 1, wherein said result of execution of said first group of program instructions is said sending of said commands from said apparatus to said hard disk drive, which can only be performed on said predefined class of disk drives.

15. The apparatus of claim 1, wherein said first group of program instructions comprises a hard disk drive device driver.

16. A method comprising storing at least a first group of program instructions in a memory in a host device; and executing said first group of program instructions in said host device to provide for a first power saving operation that causes a hard disk drive connected with said host device to operate with a lower power consumption during normal operation, averaged over a time period, than a standard power consumption that would occur in the absence of executing said first group of program instructions, wherein execution of said first group of program instructions results in delaying a write operation to a target location that is relatively distant from a current disk location;

execution of said first group of program instructions results in reordering commands to an order different from an original order in which said commands would be performed in absence of executing said first group of program instructions;

execution of said first group of program instructions results in retaining write data in a cache for a period longer than an original period for which said write data would be retained in absence of executing said first group of program instructions; or execution of said first group of program instructions results in sending commands from said host device to said hard disk drive which can only be performed on a predefined class of disk drives.

17. The method of claim 16, wherein said result of said execution of said first group of program instructions is said delaying of said write operation to said target location which is relatively distant from said current disk location.

18. The method of claim 16, wherein said result of execution of said first group of program instructions is said reordering of said commands to an order different from said original order in which said commands would be performed in absence of executing said first group of program instructions.

19. The method of claim 16, wherein said result of execution of said first group of program instructions is said retaining of said write data in said cache for said period longer than said original period for which said write data would be retained in absence of executing said first group of program instructions.

20. The method of claim 17, wherein said delaying of said write operation continues until a drive write head is no more than a threshold radial distance from said target location.

21. The method of claim 17, wherein said delaying of said write operation continues until a drive write head is no more than a threshold circumferential distance from said target location.

22. The method of claim 16, wherein said result of execution of said first group of program instructions is said sending of said commands from said host device to said hard disk drive, which can only be performed on said predefined class of disk drives.

23. The method of claim 16, wherein said first group of program instructions comprises a hard disk drive device driver.

24. A method comprising storing at least a first group of program instructions in a memory in a host device that provides for a first power saving operation in a hard disk drive connected to the host device;

storing a second group of program instructions in said memory that provides for a second power saving operation in said hard disk drive, different from said first power saving operation; and selecting at least one of said first and said second groups of program instructions for execution in said host device, wherein said first group of program instructions and said second group of program instructions are selected from a group comprising one or more of the following:

program instructions for delaying a write operation to a target location that is relatively distant from a current disk location;

program instructions for reordering commands to an order different from an original order in which said commands would be performed in absence of executing said first group of program instructions or said second group of program instructions;

program instructions for retaining write data in a cache for a period longer than an original period for which said write data would be retained in absence of executing said first group of program instructions or said second group of program instructions; or program instructions for sending commands from said host device to said hard disk drive, which can only be performed on a predefined class of disk drives.

25. The method of claim 24, further comprising executing said first group of program instructions or said second group of program instructions based on a detected environment.

26. The method of claim 24, further comprising executing said first group of program instructions or said second group of program instructions based on user input.

27. An apparatus comprising means for storing at least a first group of program instructions; and means for executing said program instructions to save power in a hard disk drive connected with said apparatus, wherein said program instructions are selected from a group comprising one or more of the following:

program instructions for delaying a write operation to a target location that is relatively distant from a current disk location;

program instructions for reordering commands to an order different from an original order in which said commands would be performed in absence of executing said program instructions;

program instructions for retaining write data in a cache for a period longer than an original period for which said write data would be retained in absence of executing said program instructions; or program instructions for sending commands from said apparatus to said hard disk drive, which can only be performed on a predefined class of disk drives.

28. The apparatus of claim 27, wherein said program instructions are said program instructions for delaying said write operation to said target location which is relatively distant from said current disk location.

29. The apparatus of claim 27, wherein program instructions are said program instructions for reordering commands to said order different from said original order in which said commands would be performed in absence of executing said program instructions.

30. The apparatus of claim 27, wherein said program instructions are said program instructions for retaining write data in said cache for said period longer than said original period for which said write data would be retained in absence of executing said program instructions.

31. The apparatus of claim 28, wherein said delaying of said write operation continues until a drive write head is no more than a threshold radial distance from said target location.

32. The apparatus of claim 28, wherein said delaying of said write operation continues until a drive write head is no more than a threshold circumferential distance from said target location.

33. The apparatus of claim 27, wherein said apparatus is a computer.

34. The apparatus of claim 27, wherein said apparatus is a portable electronic device.

35. The apparatus of claim 27, wherein said apparatus is substantially non-portable.

36. The apparatus of claim 27, wherein said program instructions are said program instructions for said sending of said commands from said apparatus to said hard disk drive which can only be performed on said predefined class of disk drives.

37. The apparatus of claim 27, wherein said program instructions comprise a hard disk drive device driver.

38. An apparatus comprising means for storing a first group of program instructions that provides for a first power saving operation;

means for storing a second group of program instructions that provides for a second power saving operation, different from said first power saving operation; and means for selecting at least one of said first group of program instructions and said second group of program instructions for execution in said apparatus to save power in a hard disk drive connected with said apparatus, wherein said first group of program instructions and said second group of program instructions are selected from a group comprising two or more of the following:

program instructions for delaying a write operation to a target location that is relatively distant from a current disk location;

program instructions for reordering commands to an order different from an original order in which said commands would be performed in absence of executing said first group of program instructions or said second group of program instructions;

program instructions for retaining write data in a cache for a period longer than an original period for which said write data would be retained in absence of executing said first group of program instructions or said second group of program instructions; or program instructions for sending commands from said apparatus to said hard disk drive, which can only be performed on a predefined class of disk drives.

39. The apparatus of claim 38, wherein said means for selecting makes a selection based on a detected environment.

40. The apparatus of claim 38, wherein said means for selecting makes a selection based on user input.

*41. An apparatus comprising*

*logic circuitry configured to execute program instructions; and*

*a memory communicatively coupled with said logic circuitry, storing program instructions that, when executed in said logic circuitry, provides a first power saving operation that causes a data storage circuit connected with said apparatus to operate with a lower power consumption during normal operation, over a time period, than a power consumption that would occur in the absence of executing said program instructions, wherein execution of said program instructions results in*

*delaying a write operation to a target location that is relatively distant from a current location in the data-storage circuit;*

*reordering commands to an order different from an original order in which said commands would be performed in absence of executing said program instructions;*

*retaining write data in a cache for a period longer than an original period for which said write data would be retained in absence of executing said program instructions; or*

*sending commands from said apparatus to the data storage circuit which can only be performed on a predefined class of data storage devices.*

*42. A method comprising*

*storing program instructions in a memory in a host circuit device; and*

*executing said program instructions in said host device to provide for a first power saving operation that causes a data storage circuit connected with said host device to operate with a lower power consumption during normal operation, over a time period, than a power consumption that would occur in the absence of executing said program instructions, wherein execution of said program instructions results in*

*delaying a write operation to a target location that is relatively distant from a current location of the data storage circuit;*

*reordering commands to an order different from an original order in which said commands would be performed in absence of executing said program instructions;*

*retaining write data in a cache for a period longer than an original period for which said write data would be retained in absence of executing said program instructions; or*

*sending commands from said host device to said data storage circuit which can only be performed on a predefined class of data storage devices.*

* * * * *